US008001463B2

(12) United States Patent
Burns et al.

(10) Patent No.: US 8,001,463 B2
(45) Date of Patent: Aug. 16, 2011

(54) WEB PAGE COMMUNICATIONS USING PARAMETERS AND EVENTS

(75) Inventors: Steve Burns, Palo Alto, CA (US); John G. Bellemore, San Francisco, CA (US); Michael Gardner, Farnham (GB); Vicki Shimizu, Paris (FR)

(73) Assignee: Oracle International Corporation, Redwood Shores, CA (US)

( * ) Notice: Subject to any disclaimer, the term of this patent is extended or adjusted under 35 U.S.C. 154(b) by 991 days.

(21) Appl. No.: 10/600,284

(22) Filed: Jun. 20, 2003

(65) Prior Publication Data

US 2004/0107404 A1  Jun. 3, 2004

Related U.S. Application Data (60) Provisional application No. 60/430,525, filed on Dec. 2, 2002.

(51) Int. Cl.
*G06F 17/30* (2006.01)
*G06F 3/048* (2006.01)
*G06F 19/28* (2011.01)

(52) U.S. Cl. ........ 715/234; 715/240; 715/243; 715/248; 715/273

(58) Field of Classification Search .................. 715/513, 715/501, 234, 240, 248, 273; 709/214, 204
See application file for complete search history.

(56) References Cited

U.S. PATENT DOCUMENTS

| 5,613,122 | A * | 3/1997 | Burnard et al. ................ 713/1 |
| 6,564,251 | B2 * | 5/2003 | Katariya et al. ............ 709/214 |
| 6,675,350 | B1 * | 1/2004 | Abrams et al. ............ 715/501.1 |
| 7,103,844 | B2 * | 9/2006 | Jones et al. .................... 715/742 |
| 7,367,014 | B2 * | 4/2008 | Griffin .......................... 717/107 |
| 7,502,833 | B2 * | 3/2009 | Schaeck ........................ 709/217 |
| 2001/0009016 | A1 * | 7/2001 | Hofmann et al. ............. 709/219 |
| 2002/0052954 | A1 * | 5/2002 | Polizzi et al. .................. 709/225 |
| 2003/0110448 | A1 * | 6/2003 | Haut et al. ..................... 715/513 |
| 2003/0149722 | A1 * | 8/2003 | Jolley et al. ................... 709/203 |
| 2003/0163513 | A1 * | 8/2003 | Schaeck et al. ............... 709/201 |
| 2004/0090969 | A1 * | 5/2004 | Jerrard-Dunne et al. 370/395.54 |
| 2004/0205555 | A1 * | 10/2004 | Hind et al. ..................... 715/513 |

OTHER PUBLICATIONS

Oracle, "Oracle9iAS Portal Release 2", published: May 2002, pp. 1-33.*
Steven Holzner, "Sams Teach Yourself JavaServer Pages in 21 Days", published: Sep. 24, 2002, pp. P1.*
Steven Holzner, "Sams Teach Yourself Java Server Pages in 21 Days", publsihed: Sep. 24, 2002, pp. 1, cover page.*

* cited by examiner

*Primary Examiner* — Stephen Hong
*Assistant Examiner* — Wilson Tsui
(74) *Attorney, Agent, or Firm* — Hickman Palermo Truong & Becker LLP (57) ABSTRACT

A method and apparatus for communicating between components associated with a web page and for communicating between a web page and a service is provided. According to one approach, page designers configure components associated with a particular page to use particular values by mapping parameters associated with the page to parameters associated with components of that page. According to one approach, an event is generated when a user manipulates a component associated with a page. A mapping is inspected to determine that the event is mapped to an action and the action is performed.

48 Claims, 7 Drawing Sheets

WEB PAGE COMMUNICATIONS USING PARAMETERS AND EVENTS

RELATED APPLICATION AND CLAIM OF PRIORITY

This application claims benefit of U.S. Provisional Application entitled "Web Page Communications Using Parameters and Events", No. 60/430,525, filed Dec. 2, 2002. The entire contents of this prior application are hereby incorporated by reference in its entirety for all purposes.

FIELD OF THE INVENTION

The present invention relates to communications between web pages and components associated with web pages.

BACKGROUND OF THE INVENTION

Frequently, a single web page will contain numerous components, with different types of information in each of the components. For example, a web page for a particular stock may contain a table with the stock's current price, a graph of the stock's previous prices, and news for the company selling the stock. Frequently, the components of a web page are generated by services provided by parties other than the party that designs the web page. For example, the service of generating current stock price tables may be provided by one third party, and the service of generating the graph of stock prices may be provided by yet another third party.

The code used to provide services that generate web page components is referred to as a "portlet". The party that designs a portlet is referred to herein as the portlet developer. To add value to their services, portlet developers frequently design their portlets to include tools that allow users to customize the components that are generated by their portlets. For example, the provider of a portlet that generates the current stock price table may provide a tool that allows the user to perform customizations, such as changing the stock for which price information is displayed, changing the color of the chart, changing the size of the chart, etc.

Page designers decide how pages will look and what information is to be displayed on the pages. The page designers select the best portlets to build the type of page they desire. However, the page designers are dependent on portlet developers to create portlets that have the characteristics the page designers need. Further, the portlets used in building a particular page may be developed by many different portlet developers residing in many different locations, and may be developed across a large time span.

The fact that a web page includes components generated by portlets provided by third parties may have a detrimental effect on the experience of the web page user. For example, assume that a user wants to see stock information for a different stock than is currently displayed on a web page. Because the portlets are provided by different parties, the web page user would typically have to separately customize each component on the web page using whatever customization tool that is built into the corresponding portlet.

This approach has numerous disadvantages. Not only does this approach require the user to individually customize each portlet (referred to hereinafter as "portlet level customization") on the web page, but this approach also requires the user to know how to customize the portlets. The process of customizing the portlets may be confusing to a user because the user interface provided for portlet customization may differ for each of the various components on the web page.

Further, this approach has disadvantages for the page designers and for the portlet developers. Specifically, while the web page designer would typically prefer to have more control over the user-specific customization of the web pages that they are designing, the user-specific customization of components is handled by the portlets. On the other hand, portlet designers would generally prefer not to have the responsibility of managing all of the user-specific customizations of the components their portlet is generating.

Typically, when a user specifies a customization using a portlet's customization tool, the customization is stored so that, in future requests by the same user, the component generated by the portlet will continue to reflect the customization. However, some portlets are designed to handle "one-time" customizations that are specified in the URL associated with the portlet. Specifically, one or more parameter values may be appended to a URL that requests a service provided by a portlet. The URL may be parsed by a portlet to extract the parameter values, and the portlet may generate a component that is customized based on the parameter values thus extracted. However, this approach requires the portlets to parse the URL for parameters. Not only is parsing the user-specified URL cumbersome, but this approach incurs the same disadvantages already described in building portlets. Further, this approach requires a user to re-enter the same customized URL every time the user wants to see the same customized component.

Frequently web pages have links to other web pages. When users manipulate a user interface object that corresponds to a link, a request is sent to retrieve the web page specified in the link. These links are static in that the URL of the particular web page to which they correspond is hard-coded into the link.

Components that are generated by portlets may also include static links. For example, a web page used for tracking software bugs may contain a portlet with a list of static links, where each static link corresponds to a web page describing a particular bug. A page designer may want a portlet with similar capabilities, but where the portlet would display a different set of bugs, or even bugs for a different product. However, since the links are static and hard-coded into the portlet, a portlet developer would have to develop a new portlet to address the needs of the page designer.

Typically, when a user interacts with a component on a page, where the component is provided by a third-party portlet, the response to the interaction is determined entirely by the portlet. Under many circumstances, a page designer would prefer to have more control over the user experience, including having the ability to specify how the web page responds to user interactions with components provided by third-party portlets.

As it can be seen, there is a need to facilitate user-customization of web pages that include components generated by portlets. In addition, there is a need to allow a designer of a web page to specify actions that will be performed in response to user interaction with components, designed by third-parties, that are included in the web page.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for communicating between components associated with a web page and for communicating between a web page and a service is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

According to one embodiment, techniques are provided that allow communications with components associated with a page in order to synchronize the display of the components. For example, a particular value, such as a company name, may be used to determine how to display one or more components in a page. A company name, such as IBM, may be passed as a parameter from the web page to both a current stock price component and a graph component of the stock's previous prices. "Portlet parameters", which shall be described in greater detail hereinafter, are used to facilitate the passing of values from web pages to portlets. For example, the value "IBM" may be passed to portlets to cause the portlets to respectively display the current stock price for IBM and a graph for IBM's previous prices.

According to one embodiment, a parameter is established for the page (referred to hereinafter as a "page parameter"). The page parameter may be mapped to a portlet parameter of each of the portlets. The value associated with the page parameter is passed to each of the portlets, as the value for the portlet parameters to which it was mapped. All of the portlets that receive the value generate components for the page that are customized based on the value, thus, synchronizing the display of the components in the page.

When passing values to portlets, the mapping is inspected to determine which portlet parameters will receive a value from the page parameter. For example, a page parameter may have a value of "IBM". The page parameter may be mapped to a portlet parameter for the current stock price component and to a portlet parameter for the graph component. This mapping is used to determine that the value "IBM" from the page parameter should be passed as both the portlet parameter associated with the current stock price component and the portlet parameter associated with the graph component. The portlets use the "IBM" values, passed as the portlet parameters, to display "IBM" versions of the components.

According to one embodiment, techniques are provided for mapping an event, which was generated in response to a user manipulating a component in a page, to the performance of an action. The page designer of the page that contains the component, rather than the portlet designer, may dictate the action to be performed. According to one embodiment, the action results in the invocation of a second page. For example, when a user manipulates a user interface object associated with a particular component of the first page, the portlet for the particular component generates an event. Logic associated with the page intercepts the event, inspects a mapping to determine that the event maps to the second page, and causes the second page to be displayed. According to one embodiment, values associated with the event are communicated to the second web page. A mapping between the values associated with the event and the page parameters of the second page is inspected to determine that values associated with the event should be passed to the page parameters of the second page.

Structural Overview

Figure 1:
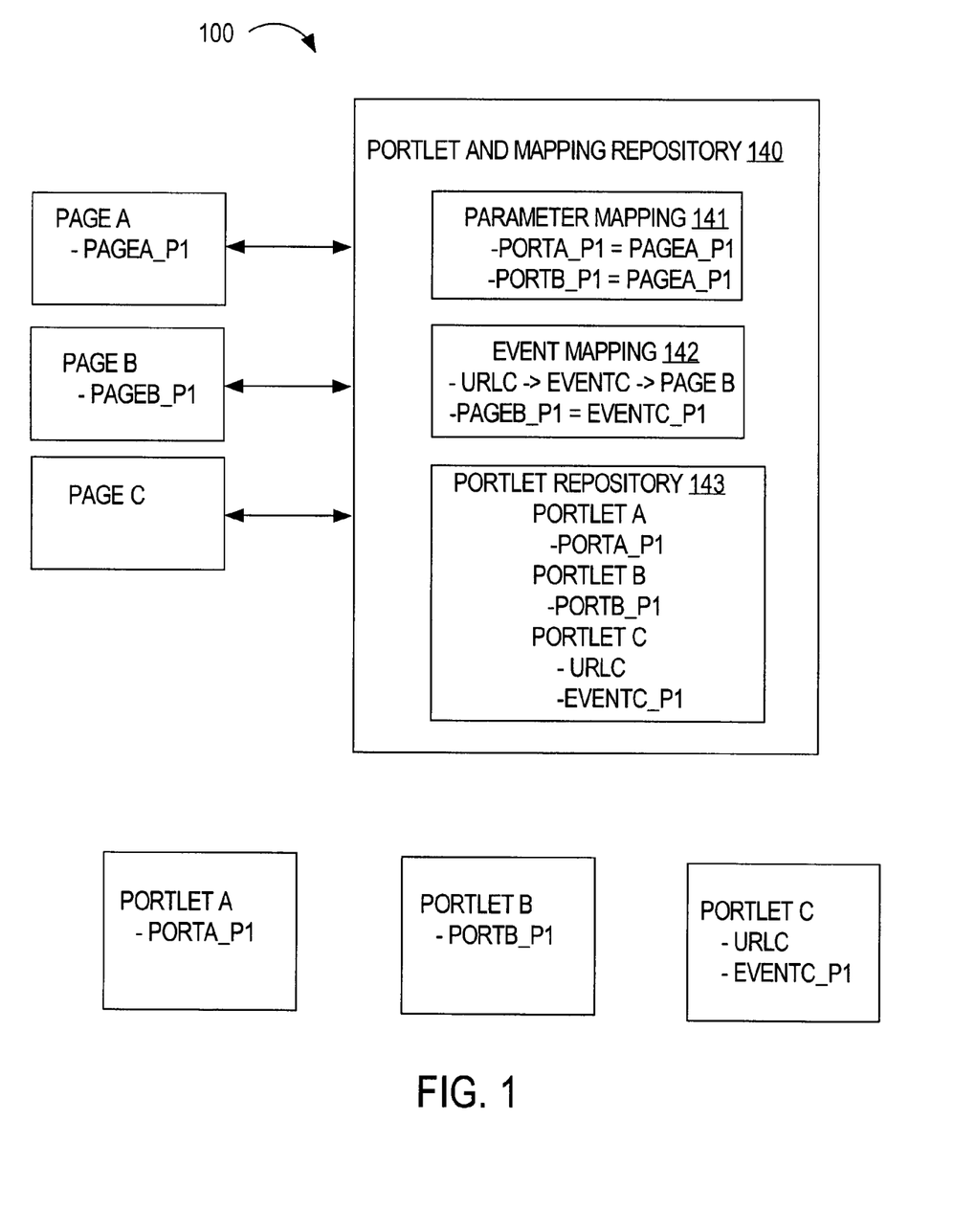
FIG. 1 is a block diagram that illustrates an overview of a system that may be used to pass parameter values from pages to components, and to pass events from components to page logic.

FIG. 1 is a block diagram that illustrates an overview of a system that may be used to pass parameter values from pages to components, and to pass events from components to page logic. System 100 comprises pages A, B, and C, a portlet and mapping repository 140, providers 120A and 120B, and portlets A, B, and C. The portlet and mapping repository 140 comprises a parameter mapping 141, an event mapping 142, and a portlet repository 143.

An interface is provided for registering portlets with the portlet and mapping repository 140. As a result of registering portlets, information is stored in the portlet repository 143 which comprises, among other things, data that identifies portlets, the portlet parameters used by the portlets, and events generated by the portlets. For example, portlet repository 143 includes information, which reflects that portlet parameter portA_p1 is associated with portlet A.

According to one embodiment, page designers map portlet parameters to the page parameters associated with a page, and this mapping is used to determine which values the page communicates to portlets. For example, parameter mapping 141 maps portlet parameter portA_p1 to page parameter pageA_p1, as will be described in more detail.

According to one embodiment, events raised by portlets are mapped to actions, where the actions are performed by the page logic when the events occur. For example, an action to which an event may be mapped may involve requesting a particular web page. The event mapping 142 maps events, which are raised while manipulating a component associated with a particular portlet of a page (referred to hereinafter as a "source page"), to an action. According to one embodiment, the event mapping 142 also maps parameter names associated with values that the event outputs (referred to hereinafter as "event output parameters") to parameters that are used in performing the action (referred to hereinafter as "target parameters"). In some situations, performing the action results in the invocation of a target service, such as the invocation of a page (referred to hereinafter as a "target page") and the target parameters are page parameters associated with that target page. As an example, event mapping 142 maps eventC, which may be raised as a result of a user manipulating a component in page C, to the invocation of page B and maps event output parameter eventC_p1 to page parameter pageB_p1, as will be described in more detail hereafter.

Passing Parameter Values to Components

Figure 2:
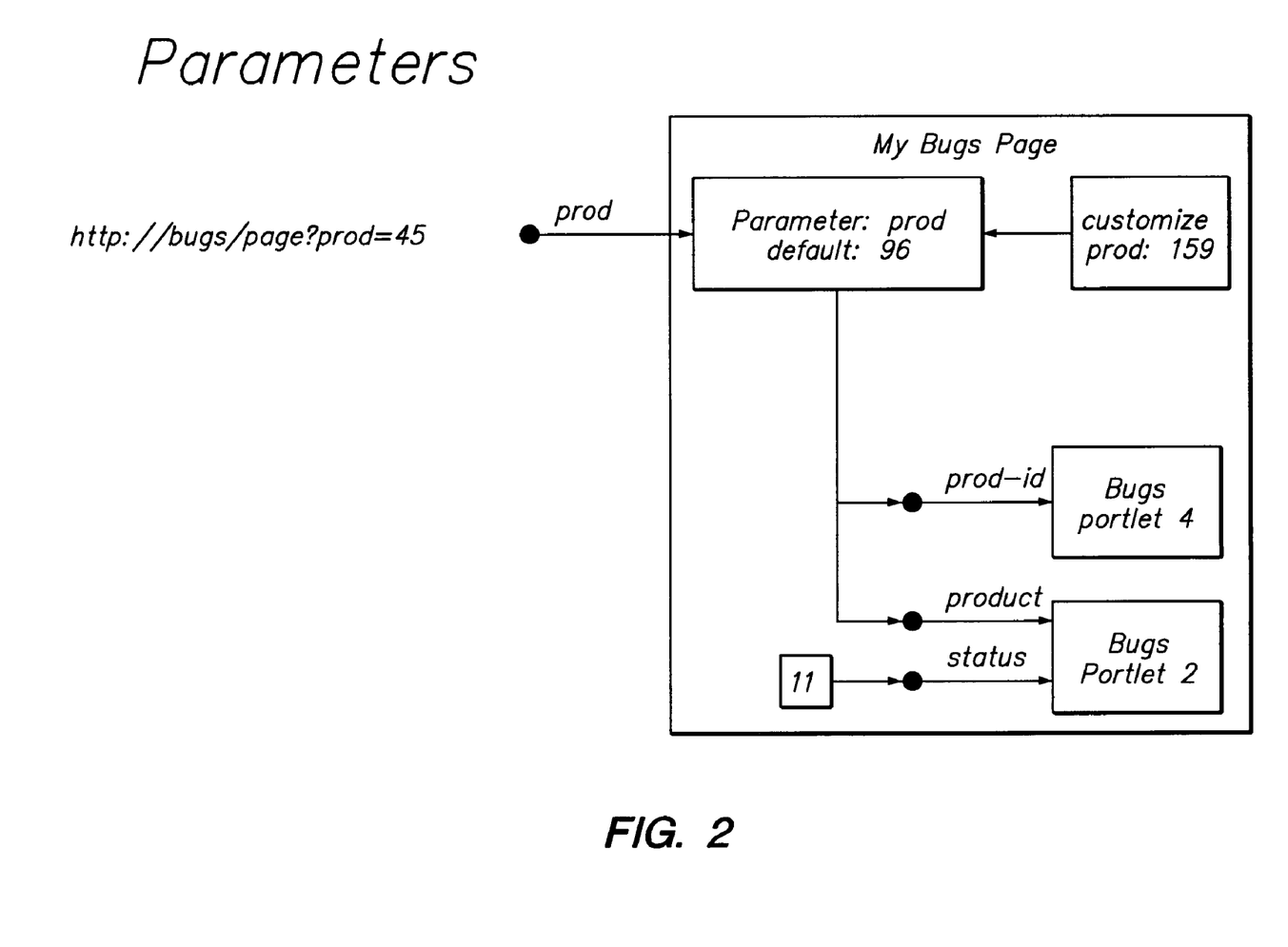
FIG. 2 is a block diagram illustrating an overview of how parameters may be passed from a page to the portlets associated with components of the page.

FIG. 2 is a block diagram illustrating an overview of how parameters may be passed from a page to the portlets associated with components of the page. FIG. 2 depicts a web page, "My Bugs Page" with two portlets ("Bugs Portlet 1" and "Bugs Portlet 2") that are used in displaying the page, a page level customization mechanism, a page parameter ("prod") and portlet parameters ("prod-id", "product", and "status").

According to one embodiment, there are three ways of assigning a value to the page parameter "prod". The first is through a parameter associated with a URL (referred to hereinafter as a "URL page parameter value"). For example, the URL has a parameter "prod=45", which results in the page parameter "prod" being assigned a value of 45. Standard URL syntax may be used for specifying the parameter on the URL. The second is by assigning a default value (referred to hereinafter as a "default page parameter value"). Typically, the default page parameter value is established by the page designer at the time the page is designed. For example, the page parameter "prod" may be assigned a default value of 96. The third is through the page level customization mechanism (referred to hereinafter as a "customized page parameter value"). Typically, customized web page parameter values are specified by a user of the page. For example, a user may use a page level customization mechanism associated with the page "My Bugs Page" to assign a value of 159 to the page parameter "prod". Lastly, the portlet itself can specify the value of 53 for a portlet parameter (referred to hereinafter as a "portlet specified value"). For example, portlet "Bugs Portlet 1" may specify a value for the portlet parameter "prod-id".

According to one embodiment, page parameters are mapped to portlet parameters. Typically, this mapping will be specified by the page designer using a generalized user interface, such as that shown in FIG. 3B. For example, in FIG. 2, the page parameter "prod" is mapped to the portlet parameters "prod-id" and "product". Since "Bugs Portlet 1" and "Bugs Portlet 2" both receive the same value associated with "prod", a user does not need to manually synchronize the components associated with these portlets via portlet level customization mechanisms. Rather, a single change in the page parameter using the page level customization tool automatically affects all components that are associated with portlets that have portlet parameters to which the page parameter is mapped. Further, the value associated with "prod" may be stored in non-volatile memory. The next time a user displays "My Bugs Page", this value is retrieved from non-volatile memory and passed to "prod-id" and "product", thus, synchronizing the portlets when "My Bugs Page" is re-displayed.

Instead of using the mapping of page parameters to portlet parameters to assign values, constants may be assigned to portlet parameters. For example, the portlet parameter "status" is assigned a constant value of 11.

According to one embodiment, an override hierarchy is used to determine which value is actually passed from the page to a portlet as a portlet parameter. According to one embodiment, the override hierarchy's precedence of assigning values to a page parameter is as follows: URL page parameter value, customized page parameter value, and default page parameter value. Lastly, a particular portlet parameter may be assigned a portlet specified value.

For example, if both a customized page parameter value and a URL page parameter value are specified, then the URL page parameter value is assigned to the page parameter. In other words, the page parameter "prod" would be assigned the value of 45 instead of the value of 159. To continue the example, if a URL page parameter value is not specified but both a default page parameter value and a customized page parameter value are specified, then the customized page parameter value is assigned to the page parameter. In other words, the page parameter "prod" is assigned the value of 159 instead of the value of 96. Further, if neither a URL page parameter value nor a customized page parameter value are specified, but a default page parameter value and a portlet specified value are specified, then the default page parameter value is assigned to the page parameter. In other words, the page parameter "prod" is assigned the value of 96 from the default page parameter value. If the portlet parameter "prod-id" has a portlet specified value of 230, "prod-id" will be assigned the value of 96 from "prod", overriding the value of 230.

The value that is ultimately assigned to the page parameter "prod" is then assigned to the portlet parameters that "prod" maps to. For example, the value assigned to "prod" is assigned to "prod-id" and "product". If no values are specified for the page parameter (e.g., URL page parameter value, default page parameter value, and customize page parameter value are not specified), then a portlet specified value is assigned to the portlet parameter. For example, if the portlet "Bugs Portlet 1" specifies a value of 230 for prod-id, and no values were specified for the page parameter "prod", then prod-id is assigned the value of 230.

Generalized User Interface for Specifying a Parameter Mapping

Figure 3A:
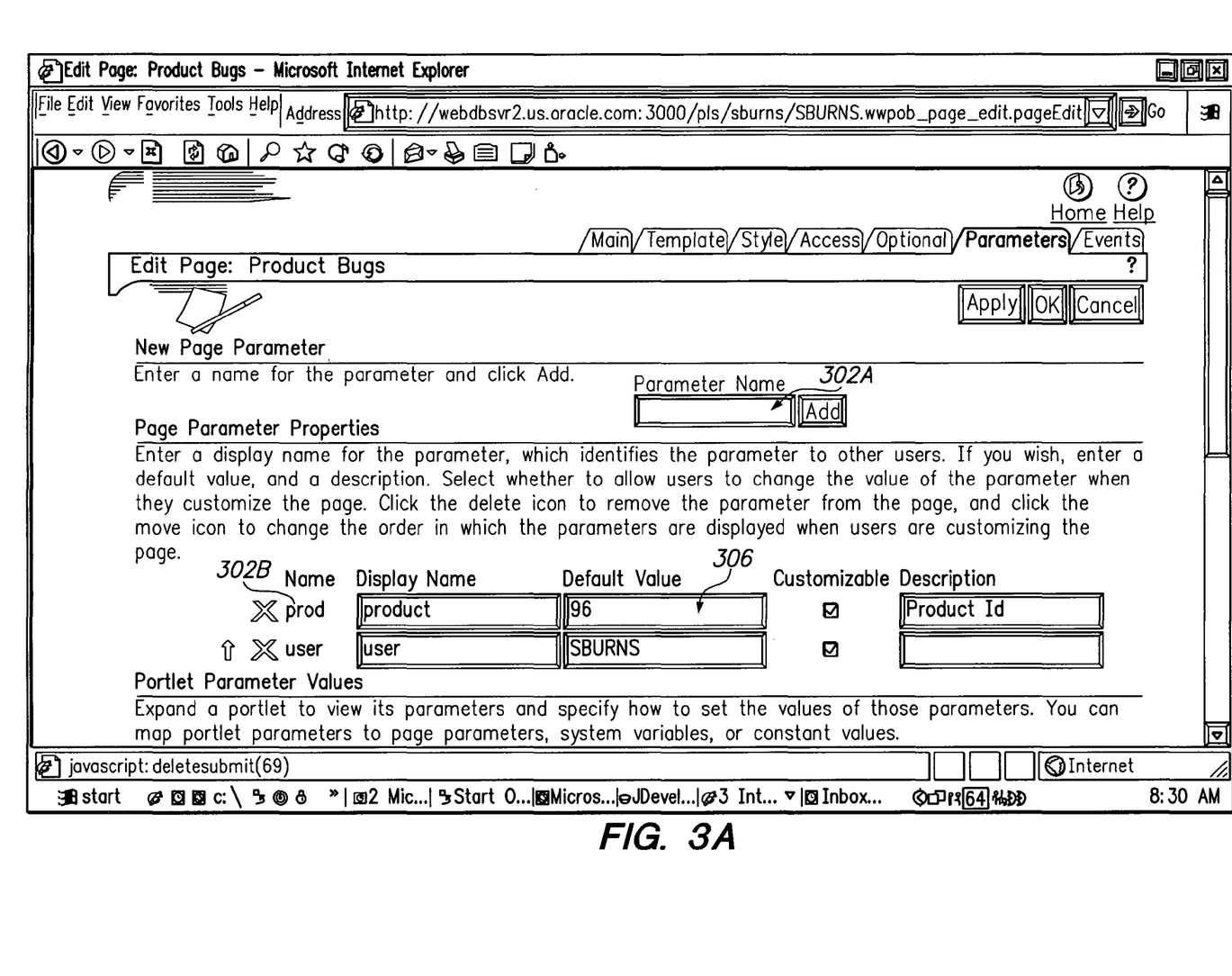
FIGS. 3A and 3B depict a generalized user interface that may be used for specifying a mapping between page parameters and portlet parameters.
Figure 3B:
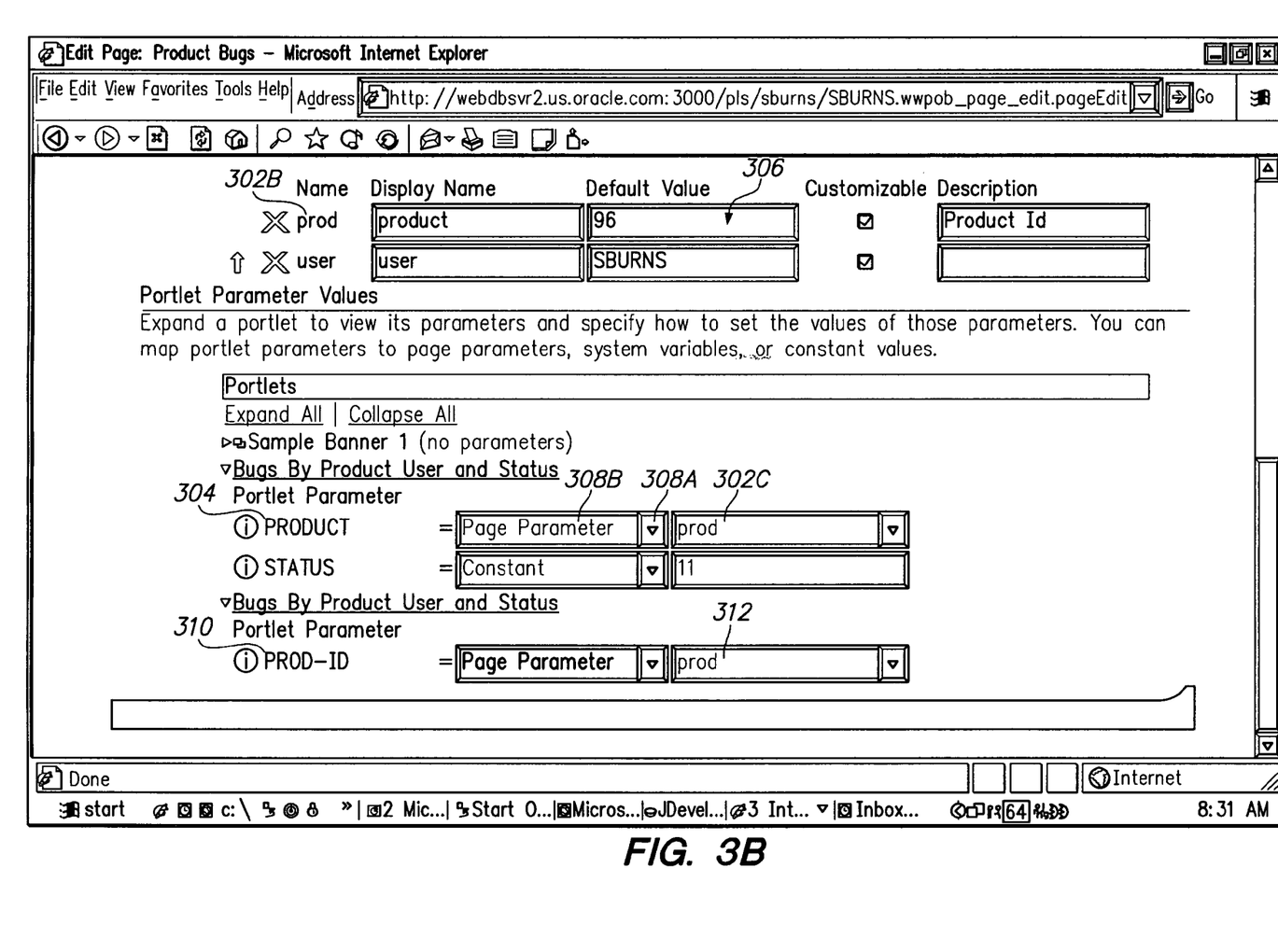

FIGS. 3A and 3B depict a generalized user interface that may be used for specifying a mapping between page parameters and portlet parameters. The fields and labels are described with reference to the structures depicted on FIG. 2.

According to one embodiment, a page designer uses a GUI to create the parameter mapping 141. For example, entry field 302A allows a page designer to enter a page parameter's variable name, such as "prod". When a page designer enters a page parameter's variable name into entry field 302A and clicks on the "Add" button, the page parameter appears at display label 302B. For example, display label 302B displays "prod".

Entry field 306 allows a page designer to assign a default value to a page parameter. For example, a value of 96 may be used as the page parameter default value 96 for the page parameter "prod".

Display label 304 displays a portlet parameter's variable name, such as "product" for "Bugs Portlet 2". Entry field 302C allows a page designer to enter a page parameter's variable name in order to map the portlet parameter, displayed at label 304, to the page parameter. For example, the page designer may enter the variable name "prod", thus, mapping the portlet parameter "product" to the page parameter "prod".

Control 308A provides a list of choices to a page designer for creating the mapping. The item the page designer selects from the list is used in the entry field 308B. For example, if the page designer clicks on control 308A, the page designer may see a list comprising "constant", "system variable", or "page parameter". If the page designer selects "page parameter", then "page parameter" appears in entry field 308B.

Similarly, display label 310 displays another portlet parameter's variable name, "prod-id". Entry field 312 allows the page designer to enter a page parameter's variable name, thus, mapping the page parameter "prod" to the portlet parameter "prod-id".

Passing Events from Portlets to Pages

Figure 4:
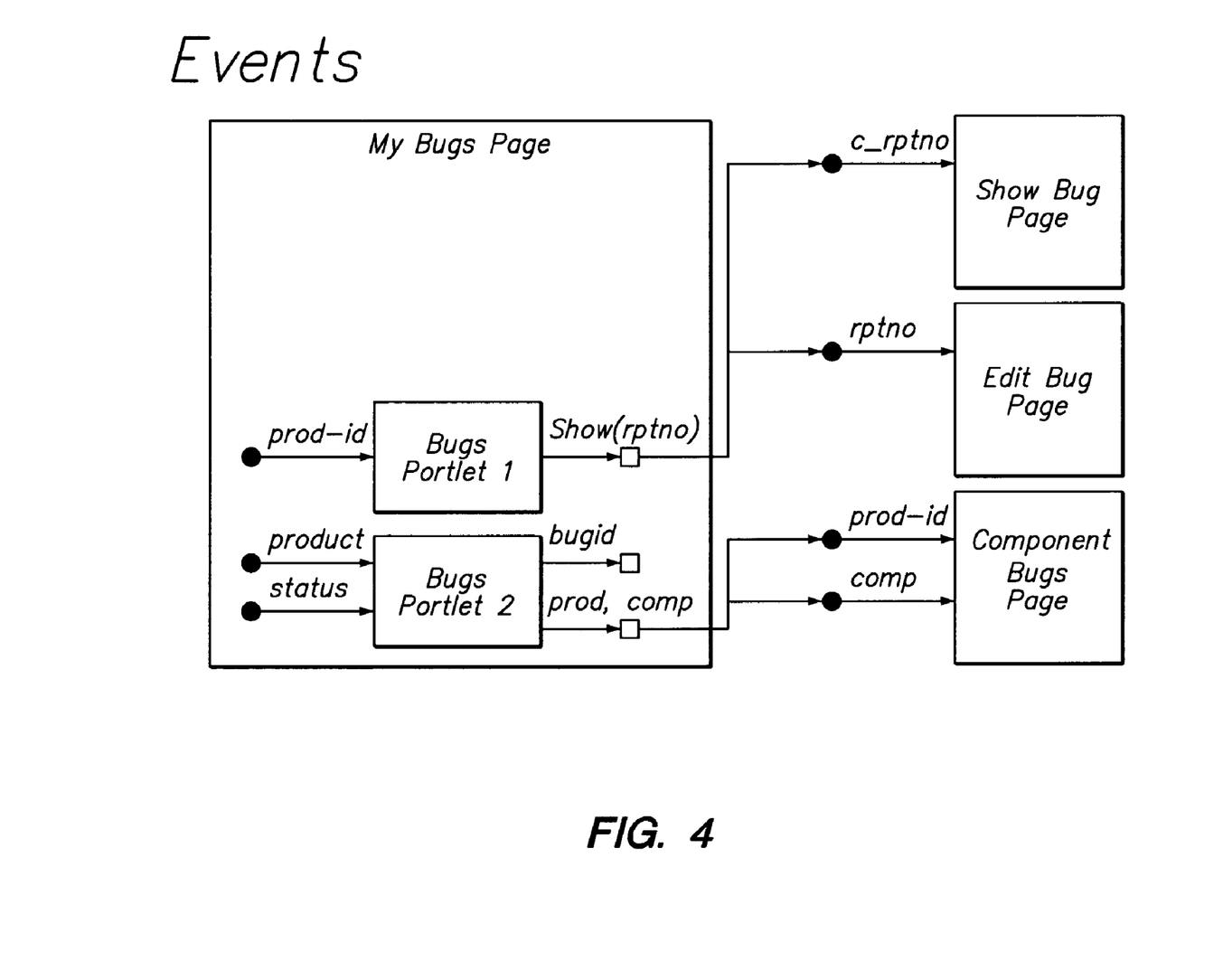
FIG. 4 is a block diagram illustrating an overview of how events may be passed from portlets to page logic.

FIG. 4 is a block diagram illustrating an overview of how events may be passed from portlets to page logic. FIG. 4 depicts a source page ("My Bugs Page") with two portlets ("Bugs Portlet 1" and "Bugs Portlet 2") that are associated with the page, portlet parameters (prod-id, product, status), three events, of which "show" is one, an event output parameter, (rptno), three target pages ("Show Bug Page", "Edit Bug Page", and "Component Bugs Page"), and page parameters (c_rptno, rptno, prod_id, and comp). The source page has logic to inspect a mapping from events to actions. The action to which an event is mapped may be, for example, invoking a target page. For example, "My Bugs Page" has logic to inspect a mapping to determine that the event "Show" maps to the action of invoking the target page "Show Bug Page", and that the event output parameter "rptno" maps to the page parameter "c_rptno".

Generalized User Interface for Specifying an Event-To-Action Mapping

Figure 5:
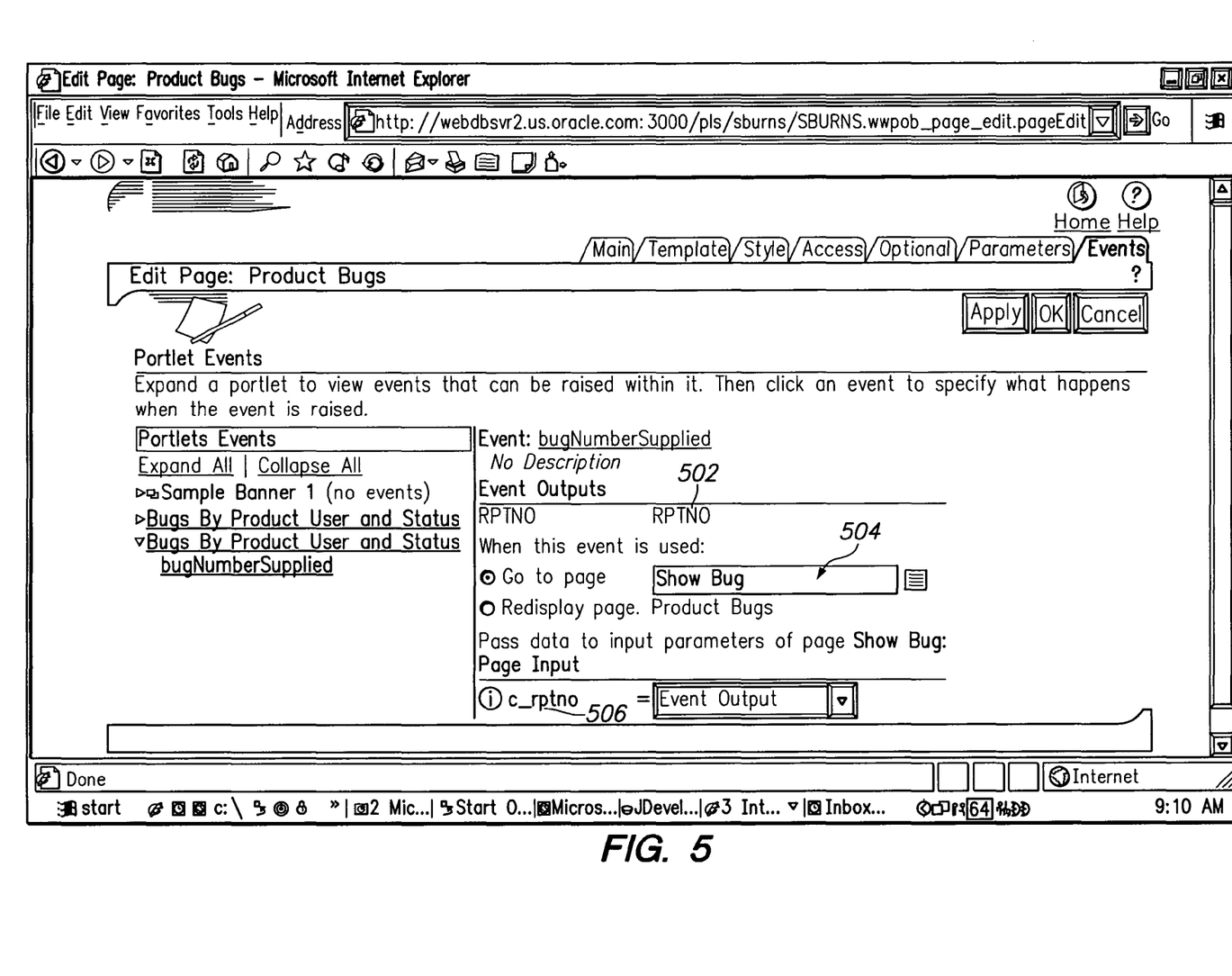
FIG. 5 depicts a generalized user interface that may be used for specifying an event-to-action mapping.

FIG. 5 depicts a generalized user interface that may be used for specifying an event-to-action mapping. The fields and labels are described with reference to the structures depicted on FIG. 4.

According to one embodiment, a web designer uses a GUI to create the event mapping 142. For example, display field 502 displays the event output parameter, such as "rptno", from an event, such as "show".

Entry field 504 allows a page designer to enter the name of a target page. For example, the page designer may enter the name of the "Show Bug Page". Display field 506 allows the page designer to specify that a page parameter be assigned the value from an event output parameter. For example, "c_rptno", which is the page parameter for the "Show Bug Page", is mapped to "rptno", which is the event output parameter for the event "Show".

An Operational Example for Specifying and Using a Parameter Mapping

For the purposes of explanation, this operational example refers to the structures depicted in FIG. 1. In registering portlets with the portlet and mapping repository 140, a portlet repository 143 is created and information associated with the registered portlets is stored in the portlet repository 143. For example, an administrator may enter a registration command, which causes provider 120A to register portlets A, B, and C with the portlet and mapping repository 140. The information associated with the portlets is uploaded to the portlet repository 143. For example, information is stored into portlet repository 143 reflecting that portlet parameter portA_p1 is associated with portlet A, portlet parameter portB_p1 is associated with portlet B, and URLC and portlet parameter portC_p1 are associated with portlet C.

According to one embodiment, the information associated with portlets is communicated to the portlet repository 143 in the form of an XML document. For example, an XML document containing information indicating that portB_p1 is associated with portlet B may be transmitted to the portlet repository 143 when an administrator registers portlet B.

A page designer builds pages that include one or more components, which are associated with portlets such as portlets A, B, and C. In building the pages, mappings, such as parameter mapping 141, are created. For example, while a page designer is building page A, the page designer uses the portlet and mapping repository 140 to provide a list of portlets that have previously been registered. The page designer may use a GUI, as already described herein, to display a list comprising portlets A, B, and C. The page designer may choose to build a page that includes components generated by one or more portlets from this list.

Assuming that the page designer chooses portlets A and B to build page A with, the GUI allows the page designer to map the portlet parameters associated with portlets A and B to the page parameters associated with page A. Data reflecting this mapping is stored in the parameter mapping 141. For example, the page designer may choose to map pageA_p1 to portA_p1 and pageA_p1 to portB_p1.

When a user requests to display page A, the value associated with pageA_p1 is assigned to both portA_p1 and portB_p1 when rendering the components associated with portlets A and B.

An Operational Example for Specifying and Using an Event-To-Action Mapping

For the purposes of explanation, this operational example refers to the structures depicted in FIG. 1. As already described herein, the page designer may request a list of portlets that have been registered and choose the portlets to build a page with. For example, the page designer may use a GUI, as already described herein, to display a list comprising portlets A, B, and C. The page designer may choose one or more portlets from this list to build page B with. For example, assume the page designer chooses to build page B with portlet B and to build page C with portlet C. Further, the page designer may want to indicate that page B is invoked as a result of a user manipulating the component associated with portlet C. The manipulation of the component may result in a request for page C where the request specifies a URL, such as URLC.

According to one embodiment, the page designer may map an event, which is raised as a result of manipulating a control associated with a URL, such as URLC, to an action. In this example, the action is the invocation of a target page, such as page B. Further, event output parameters, which are associated with the raised event, may be mapped to page parameters of the target page. When a page designer maps events to the invocation of target pages and event output parameters to page parameters, data is stored in the event mapping 142. For example, data is stored mapping URLC to eventC and eventC to the invocation of page B. Further, data is stored mapping event output parameter eventC_p1 to page parameter pageB_p1. According to one embodiment, the page designer may use a GUI, as already described herein, to create the event mapping 142.

When a user manipulates a control associated with URLC, a request is passed to page C. The logic associated with page C intercepts the request, inspects the event mapping 142 and determines that the URLC maps to eventC.

According to one embodiment, a new URL is built that specifies a target page, such as page B, and maps event output parameters, such as eventC_p1, to the page parameters, such as pageB_p1. The new URL is used to invoke the target page and pass the value associated with the event output parameter to the target parameter of the target page. For example, if eventC_p1 has a value of 56, the new URL may specify a parameter "pageB_p1=56", thus, passing the value 56 from eventC_p1 to pageB_p1.

According to one embodiment, the target page may use techniques already described herein to communicate the value of a page parameter to one or more components associated with the target page. For example, when page B receives the new URL, which specifies the parameter "pageB_p1=56", the logic associated with page B may assign the value of 56 to the portlet parameters that map to page parameter pageB_p1, as already described in the parameter embodiment.

According to one embodiment, the target service is executable code and the action is the invocation of the executable code. For example, the new URL may be used to invoke a web service or a JAVA method.

Conclusion

The architecture and processes described herein provide for communications between web pages and components associated with web pages. The parameter mapping maps page parameters to portlet parameters, allowing the page designer to configure components associated with a particular page to use a particular value, thus, synchronizing the display of the components of a page.

The event mapping maps events generated by components of source pages to actions, and event output parameters to target parameters, enabling the source page to build a new URL that results in performing the action. The new URL specifies one or more parameters, thus, providing a mechanism for assigning a value from an event output parameter associated with the event to a target parameter. Thus, the problem of components having static URLs is eliminated.

Thus, portlets may be reused in building many different pages, cutting the cost and the time involved in developing applications. Additionally, usability is increased. Users no longer need to perform portlet level customization. Since the values of page parameters, portlet parameters and/or event output parameters may be stored in non-volatile memory, users do not need to re-enter a user specified customization, such as a user specified URL, to view desired information or to perform desired actions again. Further, a target page can be bookmarked resulting in greater usability.

Hardware Overview

Figure 6:
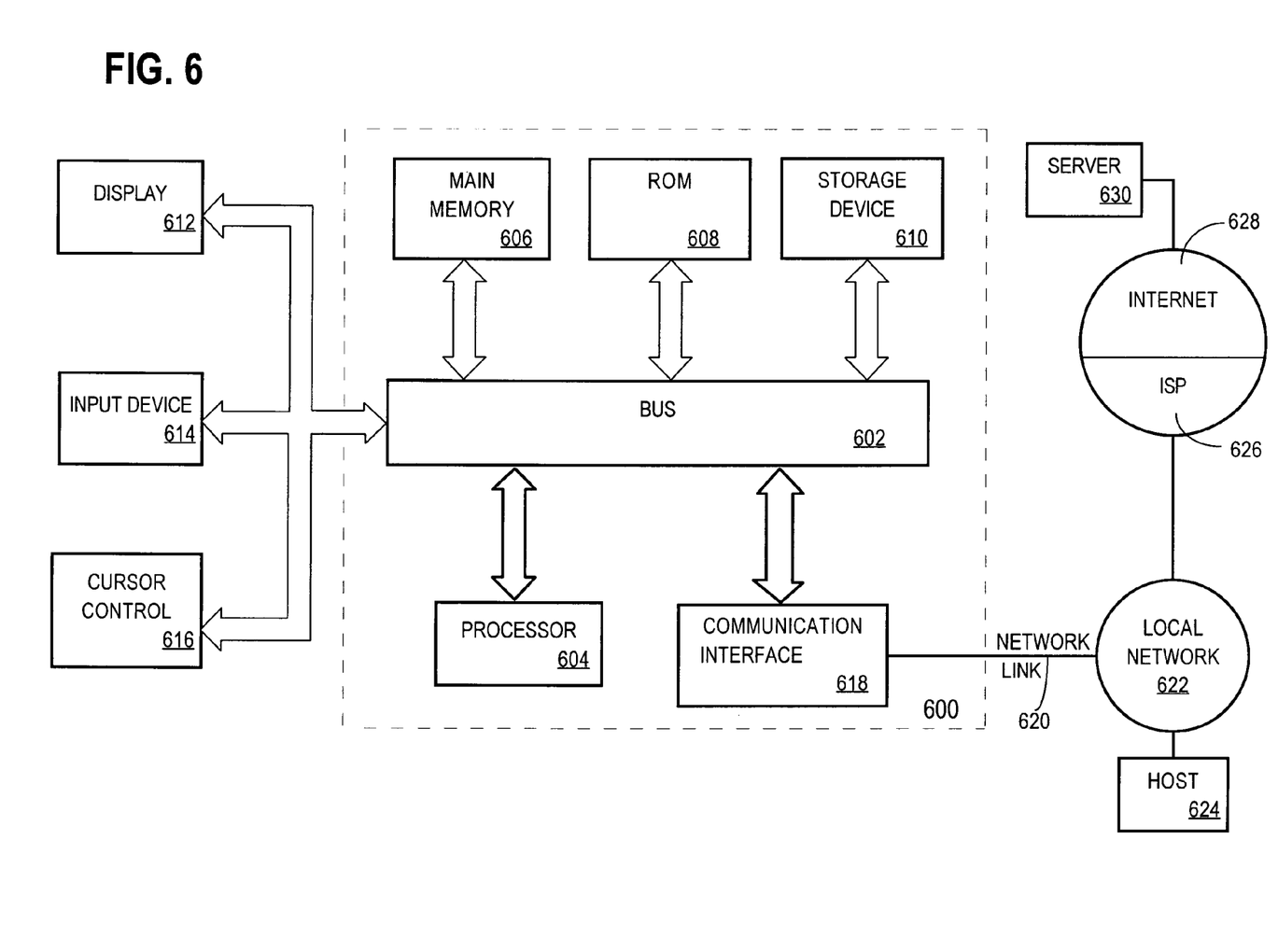
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of rendering a web page, the method comprising the computer-implemented steps of:
   receiving user input via a user interface configured to receive a user-specified association between one or more page parameter names and one or more portlet parameter names;
   based on the user input, generating and storing a mapping that maps the one or more page parameter names to the one or more portlet parameter names, wherein the mapping is stored separate from web pages associated with one or more page parameters that correspond to the one or more page parameter names;
   wherein said web pages include the web page;
   receiving a request to display the web page;
   in response to receiving the request to display the web page, performing the steps of:
     determining that the web page is associated with a particular page parameter that has a particular page parameter name from the one or more page parameter names;
     using the mapping to determine which portlet parameter names are mapped to the particular page parameter name;
     wherein using the mapping includes retrieving and inspecting the mapping to determine that the particular page parameter name is mapped to a particular portlet parameter name that corresponds to a particular portlet parameter of a portlet;
     wherein the portlet is executable code that is operable to generate page components;
     passing a value associated with the particular page parameter name to the portlet as a value of the particular portlet parameter that corresponds to the particular portlet parameter name;
     the portlet generating a component based upon the value that is passed to the portlet as the value of the particular portlet parameter; and
     inserting the component that was generated by the portlet into the web page;
   wherein the steps of the method are performed by one or more computing devices.

2. The method of claim 1, wherein:
   using the mapping further includes determining that the particular page parameter name is mapped to a second portlet parameter name that corresponds to .a second portlet parameter associated with a second component of the web page; and
   in response to receiving the request to display the web page, further performing the step of passing the value associated with the particular page parameter name as the value of the second portlet parameter that is associated with a second portlet that generates the second component.

3. The method of claim 1, wherein:
   the step of generating and storing the mapping further comprises mapping a plurality of page parameter names, corresponding to page parameters for the web page, to a plurality of portlet parameter names corresponding to portlet parameters associated with the component of the web page;
   the step of inspecting the mapping further comprises the step of determining which page parameter names of the plurality of page parameter names are mapped to each of the plurality of portlet parameter names;
   the step of passing the value further comprises the step of passing, based on the mapping, values associated with the plurality of page parameter names as the values of the portlet parameters, corresponding to the plurality of portlet parameter names, of the portlet that generates the component; and
   the step of the portlet generating the component further comprises the step of the portlet generating the component based upon the values associated with the plurality of portlet parameter names.

4. The method of claim 1, wherein the step of generating and storing the mapping comprises the step of mapping the particular page parameter name to the particular portlet parameter name associated with the component of the web page without mapping the particular page parameter name to portlet parameter names associated with any other components of the web page.

5. The method of claim 1, wherein the step of generating and storing the mapping comprises the steps of mapping the particular page parameter name to the particular portlet parameter name and mapping a second page parameter name to a second portlet parameter name corresponding to a second portlet parameter of the portlet that generates the component of the web page.

6. The method of claim 1, further comprising the step of establishing for the particular page parameter name a default value, and wherein the step of passing the value associated with the particular page parameter name further comprises the step of passing the default value as the value of the particular portlet parameter of the portlet that generates the component.

7. The method of claim 1, wherein the request to display the web page includes a URL and the URL includes the value associated with the particular page parameter name, and wherein the step of passing the value associated with the particular page parameter name is performed by passing the value contained in the URL as the value of the particular portlet parameter.

8. The method of claim 1, further comprising the steps of:
presenting to a user a user interface for customizing the web page;
in response to the user interacting with the user interface, obtaining a user specified value for the particular page parameter name; and
wherein the step of passing the value associated with the particular page parameter name is performed by passing the user specified value as the value of the particular portlet parameter of the portlet that generates the component.

9. The method of claim 1, wherein a plurality of values are specified for the particular page parameter name and wherein:
the method further comprises the step of determining a selected value from the plurality of values based on an override hierarchy; and
the step of passing further comprises the step of passing the selected value as the value of the particular portlet parameter of the portlet that generates the component.

10. The method of claim 9, wherein the plurality of values includes a URL page parameter value and a customized page parameter value and the override hierarchy specifies that the URL page parameter value is the selected value.

11. The method of claim 9, wherein the plurality of values includes a default page parameter value and a customized page parameter value and the override hierarchy specifies that the customized page parameter value is the selected value.

12. The method of claim 9, wherein the plurality of values includes a default page parameter value and a portlet specified value and the override hierarchy specifies that the default page parameter value is the selected value.

13. The method of claim 1, further comprising the step of presenting to a page designer a user interface for specifying the mapping between the particular page parameter name and the particular portlet parameter name.

14. The method of claim 1, further comprising the step of registering the portlet with a portal repository, wherein the process of registering the portlet causes data associated with the portlet to be stored in the portal repository.

15. The method of claim 14, wherein the data associated with the portlet is communicated to the portal repository as an XML document.

16. The method of claim 1, further comprising the step of receiving input from a page designer, through a user interface, to create the mapping between the particular portlet parameter name and the particular page parameter name.

17. The method of claim 1, wherein the value associated with the particular page parameter name is stored in memory and wherein:
the method further comprises the step of retrieving the stored value; and
the step of the portlet generating the component further comprises the step of the portlet generating the component based upon the retrieved value.

18. The method of claim 1, wherein the portlet is a first portlet and wherein the mapping maps a single page parameter name, of the one or more page parameter names, to a first portlet parameter name corresponding to a first portlet parameter of the first portlet and to a second portlet parameter name corresponding to a second portlet parameter of a second portlet.

19. A method comprising the computer-implemented steps of:
receiving user input via a user interface configured to receive a user-specified association between one or more events and one or more actions and a user-specified association between one or more event output parameter names and one or more page parameter names;
based on the user input, generating and storing a first mapping that maps the one or more events to the one or more actions and the one or more event output parameter names to the one or more page parameter names, wherein the first mapping is stored separate from web pages associated with one or more page parameters that correspond to the one or more page parameter names;
wherein the web pages include a web page;
in response to a user manipulating a component of the web page, a portlet that previously generated the component generating a particular event;
wherein the portlet is executable code that is operable to generate page components;
logic associated with the web page intercepting data, passed by the portlet, that represents the particular event;
retrieving and inspecting the first mapping, wherein inspecting the first mapping includes:
determining, based on the first mapping and the intercepted data, an action to perform in response to the particular event;
based on the first mapping, determining that an event output parameter name, which corresponds to an event output parameter associated with the particular event, is mapped to a particular page parameter name; and
causing the action to be performed, wherein causing the action to be performed comprises passing a value associated with the event output parameter name as the value of a particular page parameter that corresponds to the particular page parameter name;
wherein the steps of the method are performed by one or more computing devices.

20. The method of claim 19, wherein:
the web page is a first page and the particular page parameter is associated with a second page; and
the step of causing the action to be performed further comprises the step of passing the value of the particular page parameter to logic responsible for rendering the second page.

21. The method of claim 19, wherein the step of causing the action to be performed further comprises the step of generating a request that specifies a URL, wherein the value of the particular page parameter is included in the URL.

22. The method of claim 21, wherein:
the step of generating the request further comprises the step of generating a request for executable code; and
the step of causing the action to be performed further comprises the step of invoking the executable code.

23. The method of claim 22, wherein the executable code is a web service.

24. The method of claim 19, wherein:
the action comprises rendering a second page, wherein the particular page parameter is associated with the second page, and wherein rendering the second page comprises the steps of:
inspecting a second mapping to determine that the particular page parameter name is mapped to a particular portlet parameter name that corresponds to a particular portlet parameter of a second portlet that generates a second component of the second page that is based, at least in part, on the particular portlet parameter;
passing the value of the particular page parameter as the value of the particular portlet parameter, of the second portlet, that corresponds to the particular portlet parameter name;
the second portlet generating the second component based upon the value of the particular portlet parameter; and
inserting the second component that was generated by the second portlet into the second page.

25. A non-transitory computer-readable volatile or non-volatile medium storing one or more sequences of instructions for rendering a web page, which instructions when executed by one or more processers cause performance of steps comprising:
receiving user input via a user interface configured to receive a user-specified association between one or more page parameter names and one or more portlet parameter names;
based on the user input, generating and storing a mapping that maps the one or more page parameter names to the one or more portlet parameter names, wherein the mapping is stored separate from web pages associated with one or more page parameters that correspond to the one or more page parameter names;
wherein said web pages include the web page;
receiving a request to display the web page;
in response to receiving the request to display the web page, performing the steps of:
determining that the web page is associated with a particular page parameter that has a particular page parameter name from the one or more page parameter names;
using the mapping to determine which portlet parameter names are mapped to the particular page parameter name;
wherein using the mapping includes retrieving and inspecting the mapping to determine that the particular page parameter name is mapped to a particular portlet parameter name that corresponds to a particular portlet parameter of a portlet;
wherein the portlet is executable code that is operable to generate page components;
passing a value associated with the particular page parameter name to the portlet as a value of the particular portlet parameter that corresponds to the particular portlet parameter name;
the portlet generating a component based upon the value that is passed to the portlet as the value of the particular portlet parameter; and
inserting the component that was generated by the portlet into the web page;
wherein the steps of the method are performed by one or more computing devices.

26. The computer-readable medium of claim 25, wherein:
the instructions that cause performance of the step of generating and storing the mapping further comprise instructions which, when executed by the one or more processors, cause performance of the step of determining that the particular page parameter name is mapped to a second portlet parameter name that corresponds to a second portlet parameter associated with a second component of the web page; and
instructions that cause performance of the steps in response to receiving the request to display the page further comprise instructions which, when executed by the one or more processors, cause the performance of the step of passing the value associated with the particular page parameter name as the value of the second portlet parameter that is associated with a second portlet that generates the second component.

27. The computer-readable medium of claim 25, wherein:
the instructions that cause performance of the step of generating and storing the mapping further comprise instructions which, when executed by the one or more processors, cause performance of the step of mapping a plurality of page parameter names, corresponding to page parameters for the web page, to a plurality of portlet parameter names corresponding to portlet parameters associated with the component of the web page;
the instructions that cause performance of the step of inspecting the mapping further comprise instructions which, when executed by the one or more processors, cause performance of the step of inspecting the mapping to determine which page parameter names of the plurality of page parameter names are mapped to each of the plurality of portlet parameter names;
the instructions that cause performance of the step of passing the value further comprise instructions which, when executed by the one or more processors, cause performance of the step of passing, based on the mapping, values associated with the plurality of page parameter names as the values of the portlet parameters, corresponding to the plurality of portlet parameter names, of the portlet that generates the component; and
the instructions that cause performance of the step of the portlet generating the component further comprise instructions which, when executed by the one or more processors, cause performance of the step of the portlet generating the component based upon the values associated with the plurality of portlet parameter names.

28. The computer-readable medium of claim 25, wherein the instructions that cause performance of the step of generating and storing the mapping comprise instructions which, when executed by the one or more processors, cause performance of the step of mapping the particular page parameter name to the particular portlet parameter name associated with the component of the web page without mapping the-particular page parameter name to portlet parameter names associated with any other components of the web page.

29. The computer-readable medium of claim 25, wherein the instructions that cause performance of the step of generating and storing the mapping comprise instructions which, when executed by the one or more processors, cause performance of the steps of mapping the particular page parameter name to the particular portlet parameter name and mapping a second page parameter name to a second portlet parameter name corresponding to a second portlet parameter of the portlet that generates the component of the web page.

30. The computer-readable medium of claim 25, wherein the one or more sequences of instructions further comprise instructions which, when executed by the one or more processors, cause performance of the step of establishing for the particular page parameter name a default value, and wherein the instructions that cause performance of the step of passing the value associated with the particular page parameter name further comprise instructions which, when executed by the one or more processors, cause performance of the step of passing the default value as the value of the particular portlet parameter of the portlet that generates the component.

31. The computer-readable medium of claim 25, wherein the request to display the web page includes a URL and the URL includes the value associated with the particular page parameter name, and wherein the instructions that cause performance of the step of passing the value associated with the particular page parameter name comprise instructions which, when executed by the one or more processors, cause performance of the step of passing the value contained in the URL as the value of the particular portlet parameter.

32. The computer-readable medium of claim 25, wherein the one or more sequences of instructions further comprise instructions which, when executed by the one or more processors, cause performance of the steps of:
 presenting to a user a user interface for customizing the web page; and
 in response to the user interacting with the user interface, obtaining a user specified value for the particular page parameter name;
 wherein the instructions that cause performance of the step of passing the value associated with the particular page parameter name comprise instructions which, when executed by the one or more processors, cause performance of the step of passing the user specified value as the value of the particular portlet parameter of the portlet that generates the component.

33. The computer-readable medium of claim 25, wherein a plurality of values are specified for the particular page parameter name and wherein:
 the one or more sequences of instructions further comprise instructions which, when executed by the one or more processors, cause performance of the step of determining a selected value from the plurality of values based on an override hierarchy; and
 the instructions that cause performance of the step of passing the value associated with the particular page parameter name further comprise instructions which, when executed by the one or more processors, cause performance of the step of passing the selected value as the value of the particular portlet parameter of the portlet that generates the component.

34. The computer-readable medium of claim 33, wherein the plurality of values includes a URL page parameter value and a customized page parameter value and the override hierarchy specifies that the URL page parameter value is the selected value.

35. The computer-readable medium of claim 33, wherein the plurality of values includes a default page parameter value and a customized page parameter value and the override hierarchy specifies that the customized page parameter value is the selected value.

36. The computer-readable medium of claim 33, wherein the plurality of values includes a default page parameter value and a portlet specified value and the override hierarchy specifies that the default page parameter value is the selected value.

37. The computer-readable medium of claim 25, wherein the one or more sequences of instructions further comprise instructions which, when executed by the one or more processors, cause performance of the step of presenting to a page designer a user interface for specifying the mapping between the particular page parameter name and the particular portlet parameter name.

38. The computer-readable medium of claim 25, wherein the one or more sequences of instructions further comprise instructions which, when executed by the one or more processors, cause performance of the step of registering the portlet with a portal repository, wherein the process of registering the portlet causes data associated with the portlet to be stored in the portal repository.

39. The computer-readable medium of claim 38, wherein the data associated with the portlet is communicated to the portal repository as an XML document.

40. The computer-readable medium of claim 25, wherein the one or more sequences of instructions further comprise instructions which, when executed by the one or more processors, cause performance of the step of receiving input from a page designer, through a user interface, to create the mapping between the particular portlet parameter name and the particular page parameter name.

41. The computer-readable medium of claim 25, wherein the value associated with the particular page parameter name is stored in memory and wherein:
 the one or more sequences of instructions further comprise instructions which, when executed by the one or more processors, cause performance of the step of retrieving the stored value; and
 the instructions that cause performance of the step of the portlet generating the component further comprise instructions which, when executed by the one or more processors, cause the portlet to generate the component based upon the retrieved value.

42. The computer-readable medium of claim 25, wherein the portlet is a first portlet and wherein the mapping maps a single page parameter name, of the one or more page parameter names, to a first portlet parameter name corresponding to a first portlet parameter of the first portlet and to a second portlet parameter name corresponding to a second portlet parameter of a second portlet.

43. A non-transitory computer-readable volatile or non-volatile medium storing one or more sequences of instructions which, when executed by one or more processors, cause performance of steps comprising:
 receiving user input via a user interface configured to receive a user-specified association between one or more events and one or more actions and a user-specified association between one or more event output parameter names and one or more page parameter names;
 based on the user input, generating and storing a first mapping that maps the one or more events to the one or more actions and the one or more event output parameter names to the one or more page parameter names, wherein the first mapping is stored separate from web pages associated with one or more page parameters that correspond to the one or more page parameter names;
 wherein the web pages include a web page;
 in response to a user manipulating a component of the web page, a portlet that previously generated the component generating a particular event;
 wherein the portlet is executable code that is operable to generate page components;
 logic associated with the web page intercepting data, passed by the portlet, that represents the particular event;

retrieving and inspecting the first mapping, wherein inspecting the first mapping includes:
  determining, based on the first mapping and the intercepted data, an action to perform in response to the particular event;
  based on the first mapping, determining that an event output parameter name, which corresponds to an event output parameter associated with the particular event, is mapped to a particular page parameter name; and
causing the action to be performed, wherein causing the action to be performed comprises passing a value associated with the event output parameter name as the value of a particular page parameter that corresponds to the particular page parameter name.

44. The computer-readable medium of claim 43, wherein:
the web page is a first page and the particular page parameter is associated with a second page; and
the instructions that cause performance of the step of causing the action to be performed further comprise instructions which, when executed by the one or more processors, cause performance of the step of passing the value of the particular page parameter to logic responsible for rendering the second page.

45. The computer-readable medium of claim 43, wherein the instructions that cause performance of the step of causing the action to be performed further comprise instructions which, when executed by the one or more processors, cause performance of the step of generating a request that specifies a URL, wherein the value of the particular page parameter is included in the URL.

46. The computer-readable medium of claim 45, wherein:
the instructions that cause performance of the step of generating the request further comprise instructions which, when executed by the one or more processors, cause performance of the step of generating a request for executable code; and
the instructions that cause performance of the step of causing the action to be performed further comprise instructions which, when executed by the one or more processors, cause performance of the step of invoking the executable code.

47. The computer-readable medium of claim 46, wherein the executable code is a web service.

48. The computer-readable medium of claim 43, wherein:
the action comprises rendering a second page, wherein the particular page parameter is associated with the second page, and wherein rendering the second page comprises:
  inspecting a second mapping to determine that the particular page parameter name is mapped to a particular portlet parameter name that corresponds to a particular portlet parameter of a second portlet that generates a second component of the second page that is based, at least in part, on the particular portlet parameter;
  passing the value of the particular page parameter as the value of the particular portlet parameter, of the second portlet, that corresponds to the particular portlet parameter name;
  the second portlet generating the second component based upon the value of the particular portlet parameter; and
  inserting the second component that was generated by the second portlet into the second page.

* * * * *

UNITED STATES PATENT AND TRADEMARK OFFICE
CERTIFICATE OF CORRECTION

| | | |
|---|---|---|
| PATENT NO. | : 8,001,463 B2 | |
| APPLICATION NO. | : 10/600284 | |
| DATED | : August 16, 2011 | |
| INVENTOR(S) | : Burns et al. | |

It is certified that error appears in the above-identified patent and that said Letters Patent is hereby corrected as shown below:

On cover page, in column 2, under "Other Publications", line 6, delete "publsihed:" and insert -- published: --, therefor.

In column 12, line 29, in Claim 2, delete ".a" and insert -- a --, therefor.

In column 16, line 14, in Claim 26, before "instructions" insert -- the --.

In column 16, line 58-59, in Claim 28, delete "the-particular" and insert -- the particular --, therefor.

Signed and Sealed this
Fifteenth Day of November, 2011

David J. Kappos
*Director of the United States Patent and Trademark Office*